United States Patent
Brindel et al.

(10) Patent No.: US 6,807,379 B2
(45) Date of Patent: Oct. 19, 2004

(54) DEVICE FOR REGENERATING OPTICAL SIGNS

(75) Inventors: Patrick Brindel, Longpont S/Orge (FR); Christopher Janz, Nepean (CA)

(73) Assignee: Alcatel, Paris (FR)

( * ) Notice: Subject to any disclaimer, the term of this patent is extended or adjusted under 35 U.S.C. 154(b) by 583 days.

(21) Appl. No.: 09/874,119

(22) Filed: Jun. 6, 2001

(65) Prior Publication Data

US 2001/0050794 A1 Dec. 13, 2001

(30) Foreign Application Priority Data

Jun. 9, 2000 (FR) .............................................. 00 07436

(51) Int. Cl.$^7$ .................. H04B 10/00; H04B 10/02; H04B 10/04
(52) U.S. Cl. .................. 398/175; 398/155; 398/176; 398/183
(58) Field of Search ................................ 398/155, 160, 398/161, 175, 176, 180, 183

(56) References Cited

U.S. PATENT DOCUMENTS 5,999,293 A * 12/1999 Manning .................. 398/52
6,229,633 B1 * 5/2001 Roberts et al. .............. 398/9
6,282,007 B1 * 8/2001 Roberts .................... 398/155
6,366,382 B1 * 4/2002 Morthier et al. ........... 398/178
6,614,582 B1 * 9/2003 Mikkelsen et al. ......... 359/326

FOREIGN PATENT DOCUMENTS

| EP | 0 854 379 A2 | 7/1998 |
| EP | 0 901 245 A1 | 3/1999 |
| EP | 0 975 106 A1 | 1/2000 |

* cited by examiner

*Primary Examiner*—Jason Chan
*Assistant Examiner*—Dzung Tran

(57) ABSTRACT

The invention relates to a device for regenerating optical signals by intensity modulation and phase modulation of the optical signals, said device including:

a mode locking laser for recovering a clock signal representing the clock of the bits of the optical signals to be regenerated, and a modulation interferometer structure having a first interferometer arm and a second interferometer arm, enabling amplitude modulation and phase modulation of optical signals by said clock signal, and including a semiconductor amplifier in the first interferometer arm. The mode locking laser is coupled to said first interferometer arm so that said amplifier of the first interferometer arm is a common component of the mode locking laser and said interferometer structure.

23 Claims, 7 Drawing Sheets

DEVICE FOR REGENERATING OPTICAL SIGNS

The invention relates to fiber optic telecommunications and more particularly to long-haul telecommunications.

BACKGROUND OF THE INVENTION

When they propagate in fibers, optical signals are subject to various physical phenomena that degrade signal quality, mainly line losses, accumulation of noise and Gordon-Haus jitter.

Line losses can be compensated by in-line optical amplification, for example using an erbium-doped fiber amplifier (EDFA).

However, in-line amplification cannot prevent Gordon-Haus jitter, which causes uncertainty in the time of arrival of the bits of the signal.

What is more, in-line amplification leads to accumulation of noise caused by spontaneous emission in the optical amplifiers.

Also, non-linear effects such as the Kerr effect, the Raman effect and crossed-phase modulation (XPM) in wave-length division multiplex (WDM) transmission systems limit the maximum transmission distance of optical signals in some cases.

This is why it is necessary to provide regenerators at regular intervals in fiber optic transmission lines, preferably "3R" regenerators which Retime the optical signals, Reshape them to restore their original envelope and Re-amplify them to their original amplitude levels.

This kind of regenerator is described in French application FR 9809410 in the name of the Applicant, for example, in the document "140 Gbit/s polarization-insensitive and wavelength-independent InP Mach-Zehnder modulator for all optical regeneration", Electronics Letters, Vol.35, No.9, p.730, Apr. 29, 1999, and in "Contribution à l'étude de la régénération optique dans les systèmes de transmission par solitons" [A contribution to studying optical regeneration in soliton transmission systems], by O. Leclerc, a doctoral thesis submitted to Nice-Sophia-Antipolis University on Oct. 1, 1998, all of which documents are incorporated in the present description by reference.

The regenerator described in the above documents uses a Mach-Zehnder modulator for synchronous phase/amplitude modulation of the optical signals to be regenerated. Each arm of the Mach-Zehnder modulator includes a semiconductor optical amplifier whose gain is modulated using a recovered clock signal.

To this end, in one possible configuration, the regenerator uses an all-optical or an opto-electronic circuit to recover the clock signal from the optical signals to be regenerated.

However, in the above prior art regenerator, the interferometer structure and the clock signal recovery circuit constitute separate and independent entities, which impedes integration of the component.

OBJECTS AND SUMMARY OF THE INVENTION

The present invention aims to improve on a regenerator of the type disclosed in the above documents by proposing a regenerator having greater aptitude for integration.

To this end, the invention provides a device for regenerating optical signals by intensity modulation and phase modulation of the optical signals, said device including:

a mode locking laser for recovering a clock signal representing the clock of the bits of the optical signals to be regenerated, and a modulation interferometer structure having a first interferometer arm and a second interferometer arm, enabling amplitude modulation and phase modulation of optical signals by said clock signal, and including a semiconductor amplifier in the first interferometer arm, wherein the mode locking laser is coupled to said first interferometer arm so that said amplifier of the first interferometer arm is a common component of the mode locking laser and said interferometer structure.

The device of the invention can also have one or more of the following features:

said amplifier of the first arm is chosen so that the modulation of its gain caused by the effects of saturation by the optical signal to be regenerated triggers mode locking of said mode locking laser at a wavelength inside the emission band of the amplifier of the first interferometer arm, there is a second amplifier in the second interferometer arm and it includes a second mode locking laser for recovering a second optical clock signal also representing the clock of the bits of the optical signals to be regenerated and having a second wavelength different from the wavelength of the clock signal of the first mode locking laser, the second mode locking laser being coupled to said second interferometer arm so that said amplifier of the second interferometer arm is a common component of the second mode locking laser and said interferometer structure, said second semiconductor optical amplifier of the second interferometer arm is substantially identical to the first semiconductor optical amplifier of the first interferometer arm, said interferometer structure is a Michelson structure and it further includes an optical circulator having a first port receiving the optical signals to be regenerated, a second port connected to the interferometer input/output port of the Michelson structure, and a third port which is an output port for the regenerated optical signals, the mode locking laser is a ring laser including:
  a fiber for recovering the clock signals whose input is coupled to an output fiber connected to the third port of said optical circulator and whose output is connected to first coupling means for coupling optical clock signals into the first arm of said interferometer structure,
  said first interferometer arm with said first optical amplifier,
  a connecting fiber for connecting the interferometer input/output of the interferometer structure to the second port to the optical circulator, and
  a selector filter whose center wavelength is the wavelength of the optical clock signals, disposed in said recovery fiber or in said first coupling means, the first arm of said interferometer structure has an end which is reflective for the optical signals to be regenerated and at least partially transparent for optical signals at the wavelength of the recovered clock signals, and the mode locking laser is a ring laser including:
  a fiber for recovering the clock signals, one end of which is coupled to said end of the first arm and whose other end is connected to first coupling means for coupling optical clock signals into the first arm of said interferometer structure, said first interferometer arm with said first optical amplifier, and a selector filter whose center wavelength is the wavelength of the optical clock signals, disposed in said recovery fiber or in said first coupling means, it further includes second coupling means for coupling recovered optical clock signals into the second arm of the interferometer structure, there is an optical isolator in said recovery fiber to impose the direction of propagation of the recovered clock signals, there are means for time storage of the clock signals in said recovery fiber to smooth the various spectral contributions of the recovered optical clock signals, said storage means include an optical fiber of predefined length, there is an additional semiconductor optical amplifier in said first coupling means, the mode locking laser is a resonant cavity laser oscillator including:

the first arm of said interferometer structure and its end, which is reflective for the optical signals to be regenerated and for the recovered optical clock signals, a lateral branch of said interferometer structure, one end of which is coupled to said first arm and whose other end is reflective for the optical clock signals, and a selector filter in said lateral branch whose center wavelength is the wavelength of the optical clock signals, said selector filter is a Bragg reflector, there is a phase area in said lateral branch for adjusting the optical length of the cavity, there is an additional semiconductor optical amplifier in said lateral branch, the interferometer structure and the mode locking laser are integrated on the same substrate, said interferometer structure is a Mach-Zehnder structure, said mode locking laser is a ring laser including:

a fiber for recovering the clock signals whose input is coupled to first coupling means for sampling the clock signals from said first arm and whose output is connected to second coupling means for feeding optical clock signals propagating in the recovery fiber into the first arm, an optical isolator for imposing the direction of propagation of the recovered clock signals, and a selector filter whose center wavelength is the wavelength of the optical clock signals, the direction of propagation of the clock signals imposed by the optical isolator is a contrapropagating direction relative to the signals to be regenerated, the mode locking laser is a resonant cavity laser oscillator including:

a first lateral branch of said interferometer structure, one end of which is totally reflective for the optical clock signals and whose other end is coupled to said first arm, said first arm of said interferometer structure, defining the central part of the cavity, and a second lateral branch, one end of which is coupled to said first arm and whose other end is totally reflective for the optical clock signals, said interferometer structure and the mode locking laser are implemented as integrated components on the same substrate, it includes a fiber for coupling a part of the power of the regenerated optical clock signals into the second arm of said interferometer structure, and said interferometer structure is an integrated component.

BRIEF DESCRIPTION OF THE DRAWINGS

Other features and advantages of the present invention emerge from the following description, which is given by way of non-limiting example and with reference to the accompanying drawings, in which.

MORE DETAILED DESCRIPTION

As a general rule, and this applies throughout the description, identical components are identified by the same reference numbers in the various figures.

In the figures the direction of propagation of the optical signals to be regenerated and the regenerated optical signals are shown by solid-headed arrow symbols ➔ and the direction of propagation of the recovered clock signals is indicated by open-headed arrow symbol "→".

Figure 1:
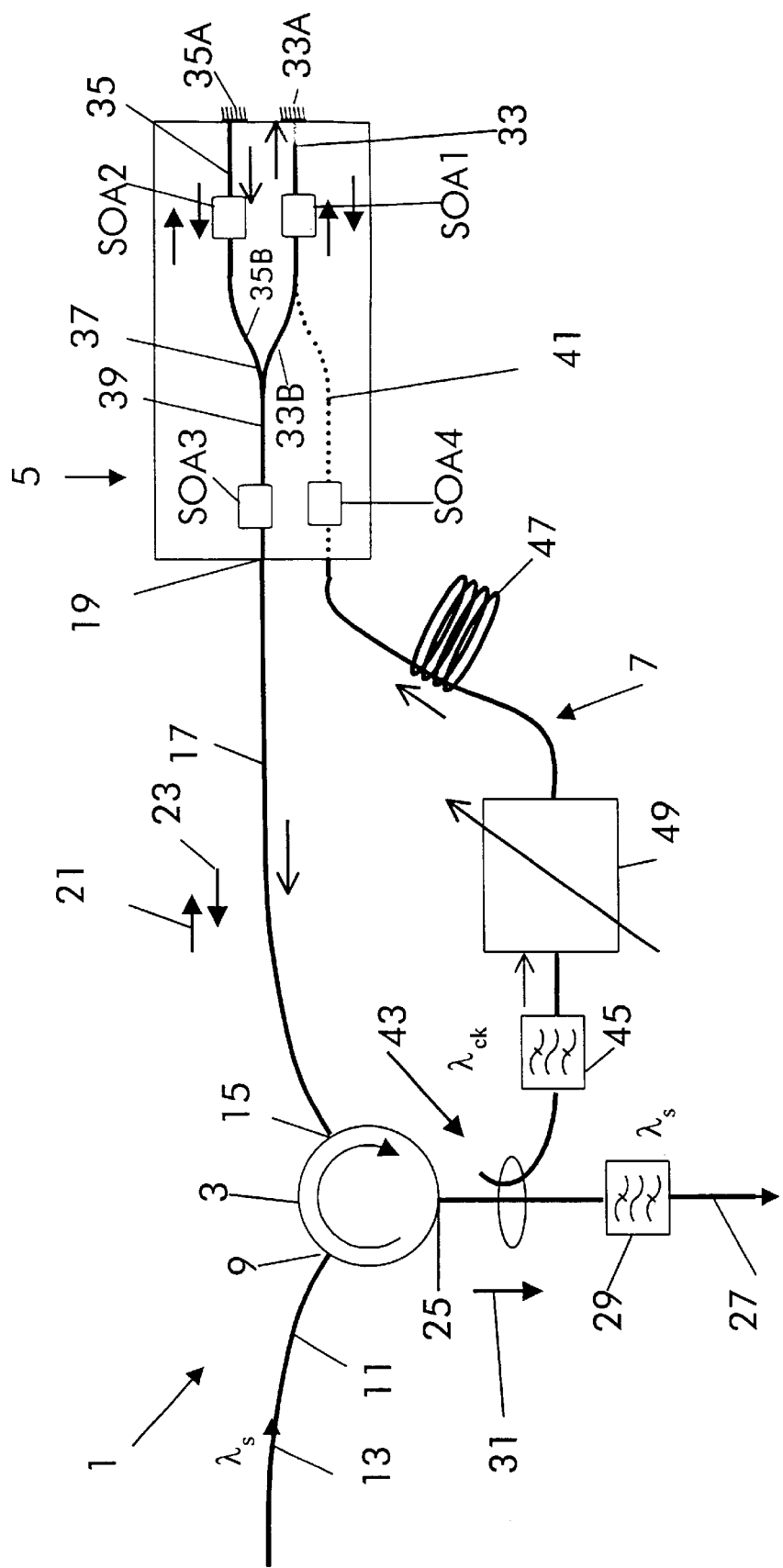
FIG. 1 is a block diagram of a first embodiment of a device according to the invention.

FIG. 1 is a block diagram of a first embodiment of a device 1 for regenerating optical signals by intensity and phase modulation.

The device 1 includes an optical circulator 3, an interferometer structure 5 and a clock signal recovery line 7.

In this embodiment the optical circulator 3 is a three-port circulator. A first port 9 is connected to an input fiber 11 and receives from that fiber 11 an optical signal to be regenerated at wavelength $\lambda_s$. This is also indicated by the arrow 13 showing the direction of propagation of the optical signals to be regenerated in the input fiber 11.

A second port 15 of the optical circulator 3 is connected by a fiber 17 to the input/output port 19 of the interferometer structure 5.

The arrow 21 above the fiber 17 indicates the direction of propagation of the signals to be regenerated, which have been transferred into the circulator 3 from its port 9 to the port 15. The arrow 23 indicates the direction of propagation of the regenerated signals at the output of the interferometer structure 5. The regenerated signals are then transferred from the port 15 to the port 25 of the circulator 3. The port 25 is connected to an output fiber 27 incorporating a filter 29 whose center wavelength is the wavelength $\lambda_s$ of the regenerated signals. The arrow 31 indicates the direction of propagation of the regenerated signals.

The interferometer structure 5 shown in FIG. 1 is a Michelson structure. It is preferably an integrated optical component with optical waveguides integrated on the same semiconductor substrate.

The interferometer structure 5 has a first interferometer arm 33 and a second interferometer arm 35. Each of the two arms 33 and 35 has a respective reflective end 33A and 35A and a respective end 33B and 35B coupled to an associated branch of a "Y" splitter 37 which has a trunk 39 connected to the input/output port 19 of the interferometer structure 5.

There is a first semiconductor amplifier SOA1 in the first arm 33 and preferably a second semiconductor optical amplifier SOA2 in the second arm 35. The amplifier SOA2 is advantageously identical to the amplifier SOA1.

There is an auxiliary semiconductor optical amplifier SOA3 in the trunk 39 of the splitter 37.

Turning to the subject of recovering clock signals, the regenerator device 1 includes a mode locking laser for recovering a clock signal representing the clock of the bits of the optical signals to be regenerated.

In FIG. 1, the mode locking laser is a ring laser including the recovery line 7, formed by an optical fiber, first coupling means 41 for coupling the recovered clock signal into the first arm 33 of the interferometer structure 5 (the coupling means 41 also take the form of a waveguide), the trunk 39 of the splitter 37, the fiber 17 connecting the input/output port 19 of the interferometer structure to the port 15 of the optical circulator 3, the part of the optical circulator for transferring the optical signals from the port 15 to the port 25, and the part of the fiber 27 between the port 25 of the circulator and the point coupled to the recovery line 7.

Clearly, one end 43 of the recovery line 7 is therefore coupled to the output fiber 27 so that clock signals transferred from the port 15 to the port 25 are recovered in the line 7.

Also, there is a filter 45 in the recovery line 7. Its center wavelength is the wavelength of the clock signals. The function of the filter 45 is to impose the wavelength $\lambda_{ck}$ at which the ring laser must operate. As explained later, the filter wavelength $\lambda_{ck}$ is judiciously chosen so that it is in within the emission bandwidth (also referred to as the amplification bandwidth) of the first semiconductor optical amplifier SOA1, so that the latter amplifier amplifies not only the signals to be regenerated at the wavelength $\lambda_s$ but also those at the wavelength $\lambda_{ck}$. Also, the amplifier SOA1 is chosen so that the modulation of its gain caused by the effects of saturation by the optical signal to be regenerated triggers locking of modes of the mode locking laser at the wavelength $\lambda_{ck}$.

Clearly the amplifier SOA1 is therefore a shared component of the mode locking laser and said interferometer structure and has more than one function: for the interferometer part, the amplifier SOA1 is involved in regenerating the optical signals, and, for the ring laser part, the amplifier SOA1 is an amplifier component also locking modes of the laser.

The auxiliary amplifier SOA3, which also operates on the optical signals to be regenerated and on the optical clock signals, serves merely as an amplifier, on the one hand for signals to be regenerated and on the other hand for optical clock signals.

To enable the gain with which optical clock signals are amplified in the ring laser to be varied, there is optionally an additional semiconductor optical amplifier SOA4 in the coupling means 41. Of course, there can also be an additional amplifier in the recovery line 7.

Also, the line 7 includes means 47 for time storage of clock signals. The storage means 47 preferably include an optical fiber of predefined length and smooth the various spectral contributions of the recovered optical clock signals. For example, for signals with a bit rate of 40 Gbit/s, a 5 m length of fiber is chosen, for example wound on a temperature-stabilized spool to store optical signals corresponding to approximately 1000 bits.

Finally, a variable optical delay line 49 in the recovery line 7 between the filter 45 and the storage means 47 varies the optical length of the ring laser.

The regenerator device in accordance with the invention operates in the following manner.

The signals at wavelength $\lambda_s$ to be regenerated are fed into the device 1 in accordance with the invention via the fiber 11, enter the circulator 3 at the port 9 and are transferred to the port 15. From there, they are routed via the fiber 17 to the input/port 19 of the interferometer structure 5. In the interferometer structure 5, the signals to be regenerated are split in the splitter 37 and coupled into the first interferometer arm 33 and the second interferometer arm 35.

In the first interferometer arm 35, amplitude/phase modulation of the signals to be regenerated is controlled by the recovered clock signals propagating in the ring laser described above, which induces "3R" regeneration of the signals at the input of the interferometer structure, because of interference effects, after reflection, with the reflected signals from the second arm 35 in the trunk of the "Y" splitter 37.

The signals regenerated in this way then propagate in the fiber 17 to the port 15 of the circulator 3, are transferred to the port 25, and exit via the output fiber 27 after final filtering in the filter 29.

During this time, the recovered clock signals propagate in the ring laser and control regeneration of the optical signals at the wavelength $\lambda_s$, as described above.

Figure 2:
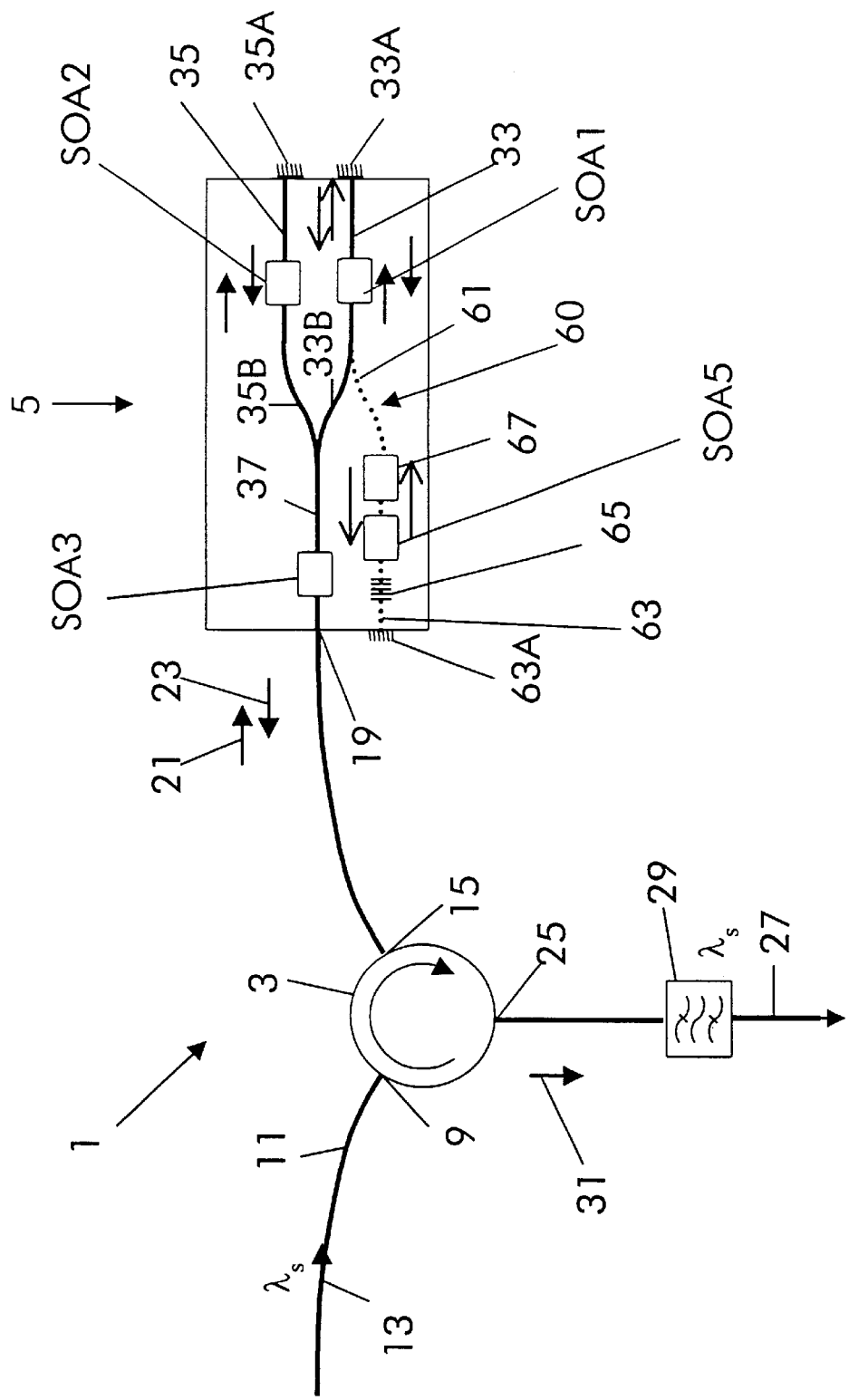
FIG. 2 is a block diagram of a first variant of the FIG. 1 embodiment.

FIG. 2 is a block diagram of a first variant of the regenerator shown in FIG. 1.

The regenerator shown in FIG. 2 differs from the regenerator shown in FIG. 1 essentially in that the mode locking laser is a linear laser or resonant cavity laser oscillator.

The resonant cavity oscillator includes the first arm 33 of said interferometer structure and its reflective end 33A and a lateral branch 60 of said interferometer structure 5, one end 61 of which is coupled to the first arm 33 and the other end 63 of which terminates at a surface 63A which is reflective for the optical clock signals.

The center wavelength of a selector filter 65 in the lateral branch, which is preferably a Bragg filter, is the wavelength $\lambda_{ck}$ of the optical clock signals to be recovered. There are also an optional additional semiconductor optical amplifier SOA5 and a phase area 67 for varying the optical length of the laser cavity in the lateral branch.

As shown diagrammatically in FIG. 2, the interferometer structure and the mode locking laser are integrated on the same substrate, which is highly advantageous not only for fabricating regenerators in accordance with the invention but also for their stability in use. Also, an integrated component is less susceptible to aging.

Apart from differences specific to the structure of their mode locking lasers, the regenerators shown in FIGS. 1 and 2 operate in a similar manner.

Figure 3:
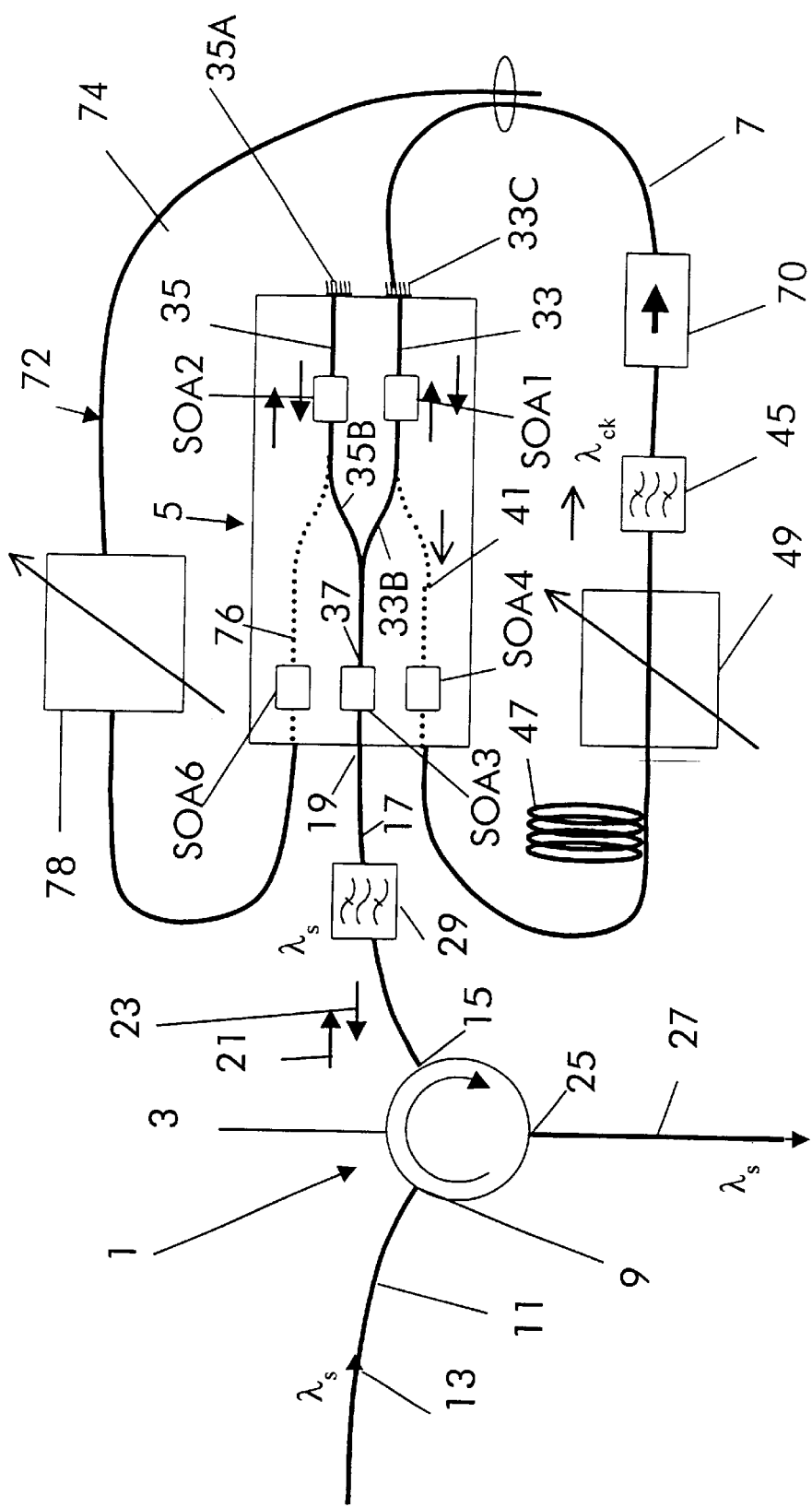
FIG. 3 is a block diagram of a second variant of the FIG. 1 embodiment.

FIG. 3 is a block diagram of a second variant of the regenerator shown in FIG. 1.

This variant is structurally very similar to the regenerator shown in FIG. 1, from which it differs mainly in a different configuration of the ring laser and because the recovered clock signals modulate optical signals in the two arms 33 and 35 of the interferometer structure 5.

As in the embodiment shown in FIG. 1, the mode locking laser is a ring laser.

In accordance with a second aspect of the invention, relating to the configuration of the ring laser, the laser includes the clock signal recovery fiber 7, one end of which is coupled to the end 33C of the first arm 33 and whose other end is connected to the means 41 for coupling optical clock signals into the first arm 33.

To assure coupling of the optical clock signals into the first arm 33 of the interferometer structure 5 without degrading the performance of the Michelson interferometer, the end 33C is reflective for the optical signals to be regenerated at the wavelength $\lambda_s$ but at least partly, and preferably almost completely, transparent for optical signals at the wavelength $\lambda_{ck}$ of the recovered clock signals.

As in the embodiment shown in FIG. 1, there are a filter 45, storage means 47 and a variable optical delay line 49 in the recovery line 7. These components have the same functions as in the embodiment shown in FIG. 1, of course.

There is also an optical isolator 70 in the recovery line 7, to impose the direction of propagation of the recovered clock signals.

Furthermore, note in FIG. 3 the presence of an additional semiconductor amplifier SOA4 in the coupling means 41, which take the form of a waveguide. The additional amplifier is optional, of course.

The ring laser shown in FIG. 3 operates and interacts with the Michelson interferometer to produce "3R" regeneration in a similar manner to the ring laser shown in FIG. 1.

In this variant, the output filter 29 is preferably in the fiber 17 connecting the circulator 3 to the interferometer structure 5, not in the output fiber 27.

According to the second aspect of this variant of the invention, the signals to be regenerated in the second arm 35 are also submitted to the action of the clock signals. The regenerator 1 according to the invention therefore further includes second coupling means 72 for coupling the recovered optical clock signals into the second arm 35 of the interferometer structure 5.

As can be seen in FIG. 3, the second coupling means 72 include a fiber 74, one end of which is coupled to the recovery fiber 7 to sample a part of the recovered clock signals, and a second lateral branch 76 of the interferometer structure 5, which takes the form of a waveguide, to which the other end of the fiber 74 is coupled and which couples the optical clock signals into the second arm 35.

There are advantageously a variable delay line 78 in the fiber 74 and an optional semiconductor optical amplifier SOA6 in the lateral branch 76.

Thanks to this configuration, in which the recovered clock signals act in both arms 33 and 35 of the interferometer structure 5, the "chirp" can be varied to suit the signals to be regenerated.

Otherwise, the operation of the variant shown in FIG. 3 is similar to that of the variant shown in FIG. 1.

Figure 4:
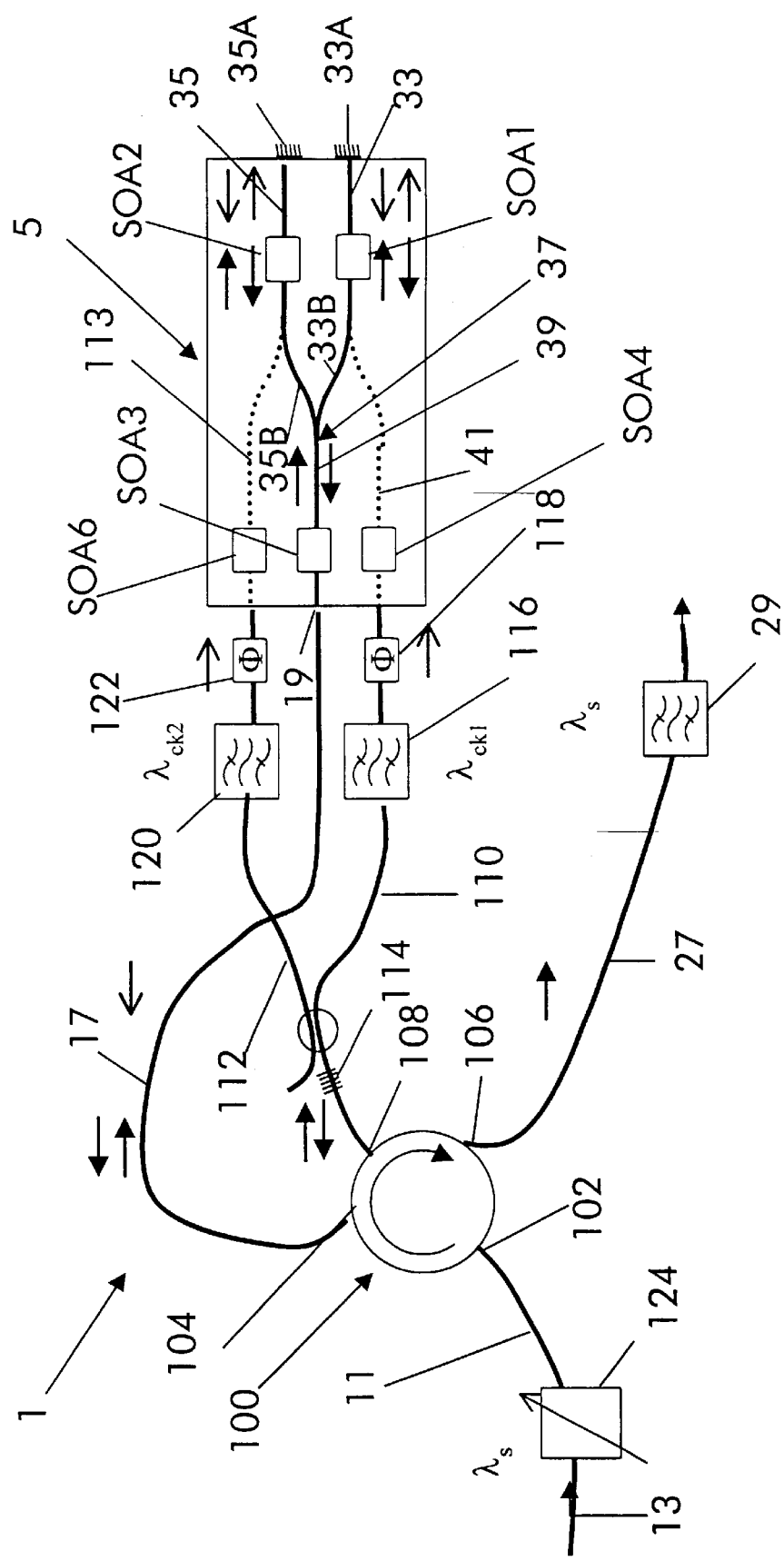
FIG. 4 is a block diagram of a third variant of the FIG. 1 embodiment.

A third variant, whose block diagram is shown in FIG. 4, also varies the "chirp" to suit the optical signals to be regenerated, and differs from the second variant, shown in FIG. 3, in particular because it uses two independent mode locking lasers, each operating at its own wavelength and in conjunction with an associated arm of the interferometer structure.

Both of the mode locking lasers shown in FIG. 4 are ring lasers. A four-port optical circulator 100 is used to implement the two ring lasers for recovering clock signals. Its first port 102, its second port 104 and its final port 106 have the same functions as the respective ports 9, 15 and 25 of the circulator 3 shown in FIG. 1.

The additional port 108 between the port 104 and the port 106 is connected directly to the coupling means 41 of the interferometer structure 5 by a fiber 110 and indirectly to second coupling means 113 of the interferometer structure 5 by a fiber 112 coupled to the fiber 110.

There is a reflector integrated fiber Bragg grating (RIFBG) filter 114 in the fiber 110 near the port 108. The grating constant of the Bragg grating written in the fiber 110 is chosen so that optical signals at the wavelength $\lambda_s$ of the signals to be regenerated are reflected but optical signals at the wavelength of the clock signals pass through the filter substantially without attenuation. This is necessary for the regenerated signals coming from the port 104 and transferred to the port 108 to be sent directly to the same port 108 for final transfer to the output port 106.

Also, there are respective filters 116 and 120 and respective variable delay lines 118 and 122 in each fiber 110, 112. The respective ring lasers of the filters 116 and 120 have the same function as the filter 45 of the regenerator shown in FIG. 1. In other words, to impose the operating wavelength of the ring laser, they are filters whose center wavelengths are the wavelengths of the respective clock signals $\lambda_{ck1}$ and $\lambda_{ck2}$.

In the first ring laser the recovered optical clock signals at the wavelength $\lambda_{ck1}$ propagate in the fiber 110 from the port 108 of the circulator 100 via the Bragg filter 114, the filter 116 and the variable delay line 118, enter the first coupling means 41, with its additional semiconductor optical amplifier SOA4, and pass from there into the first arm 33 of the interferometer structure 5, with its semiconductor optical amplifier SOA1. The clock signals at the wavelength $\lambda_{ck1}$ are then reflected at the end 33A, pass again through the amplifier SOA1, and are coupled into the trunk 39 of the "Y" coupler 37, before finally returning via the fiber 17 to the port 104 and thence to the port 108 of the circulator 100.

In the second ring laser the recovered optical clock signals at the wavelength $\lambda_{ck2}$ propagate in the fiber 110 from the port 108 of the circulator 100 and via the Bragg filter 114. They are coupled into the fiber 112 with its filter 120 and adjustable delay line 122 and enter the second coupling means 76, with its additional semiconductor optical amplifier SOA6, and then the second arm 35 of the interferometer structure 5, with its semiconductor optical amplifier SOA2. The clock signals at the wavelength $\lambda_{ck2}$ are then reflected at the end 35A. Of course, the reflective powers at the ends 33A and 35A are matched to the respective wavelengths $\lambda_{ck1}$ and $\lambda_{ck2}$, which are different. The clock signals at the wavelength $\lambda_{ck2}$ recovered in this way then pass through the amplifier SOA2 and are coupled into the trunk 39 of the "Y" coupler 37, and finally return via the fiber 17 to the port 104 and thence to the port 108 of the circulator 100.

Clearly, optical signals at three different wavelengths therefore propagate in the fiber 17, namely the signals to be regenerated and the regenerated signals at the wavelength $\lambda_s$ and the recovered optical clock signals at the respective wavelengths $\lambda_{ck1}$ and $\lambda_{ck2}$.

In accordance with the same principles as apply to the regenerator shown in FIG. 1, the filter wavelengths $\lambda_{ck1}$ and $\lambda_{ck2}$ are chosen to lie inside the emission band of the semiconductor optical amplifiers SOA1 and SOA2.

It is therefore clear that in this embodiment the amplifiers SOA1 and SOA2 are common components of the interferometer structure and the respective mode locking lasers.

There is optionally an adjustable delay line 124 in the input fiber 11.

Figure 5:
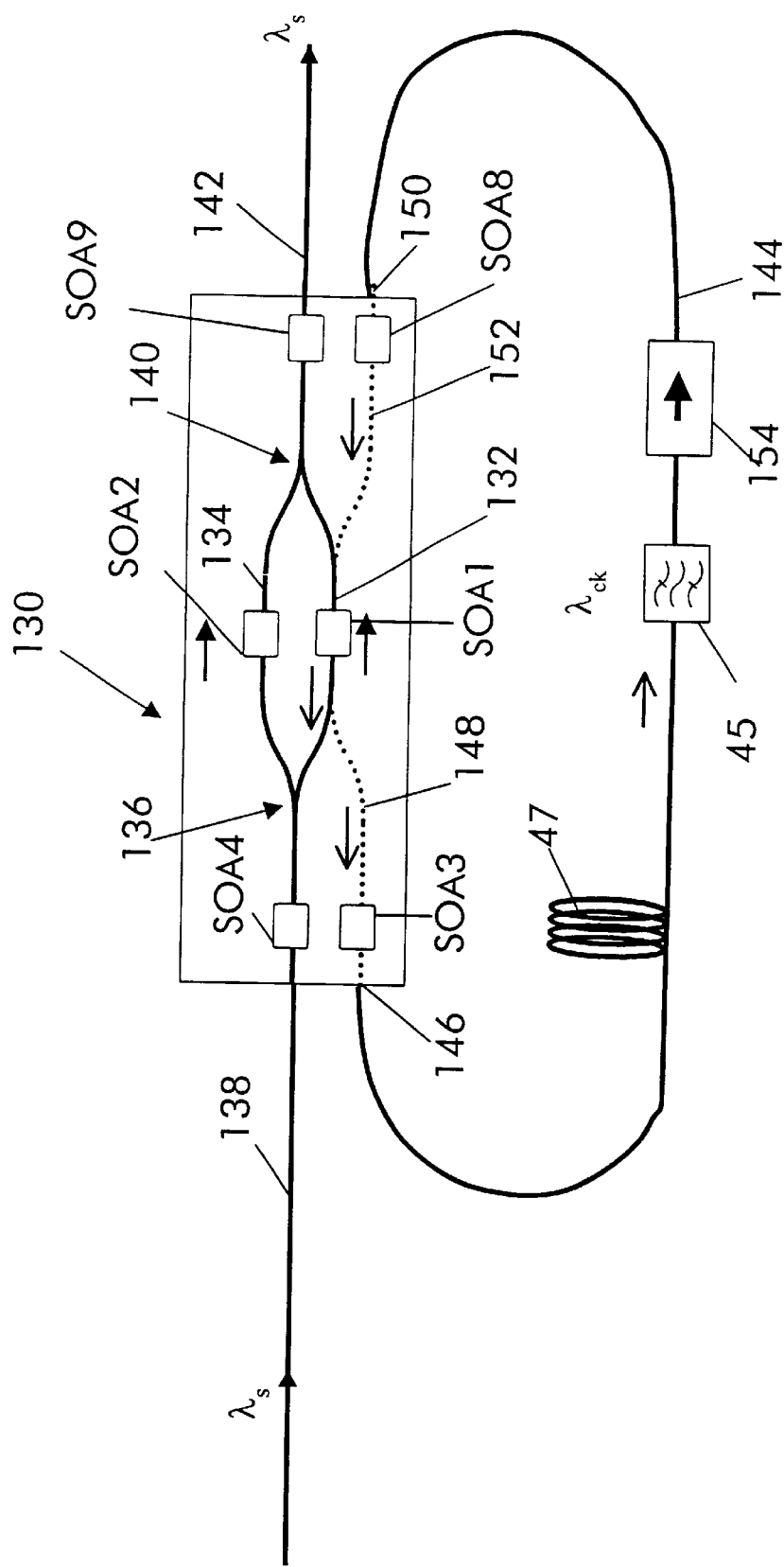
FIG. 5 is a block diagram of a second embodiment of a device according to the invention.

Refer now to FIG. 5, which shows a second embodiment of a regenerator according to the invention.

This embodiment differs from the embodiment whose various variants are shown in FIGS. 1 to 4 essentially in that the interferometer structure is a Mach-Zehnder structure 130.

To be more precise, the Mach-Zehnder interferometer structure 130 includes first and second interferometer arms 132 and 134 with respective semiconductor amplifiers SOA1 and SOA2. The arms 132 and 134 are connected by a first "Y" coupler 136 to an input fiber 138 for the optical signals to be regenerated and by a second coupler 140 to an output fiber 142 for the regenerated optical signals.

To assure "3R" regeneration in accordance with the operating principles of the first embodiment, shown in FIGS. 1 to 4, the regenerator shown in FIG. 5 includes a mode locking laser formed by a ring laser including a fiber 144 for recovering the clock signals, whose input 146 is coupled to first coupling means 148 for sampling the clock signal from the first arm 132 and whose output 150 is connected to second coupling means 152 for feeding optical clock signals propagating in the recovery fiber 144 into the first arm 132.

There are in the fiber 144 an optical isolator 154 for imposing the direction of propagation of the recovered clock signals, the selector 45, whose center wavelength is the wavelength $\lambda_{ck}$ of the optical clock signals, and the means 47 for time storage of the clock signals.

There are optional semiconductor optical amplifiers SOA3 and SOA8 in the respective coupling means 148 and 152.

Similarly, there are respective auxiliary semiconductor amplifiers SOA4 and SOA9 in the trunk of the "Y" couplers 136 and 140.

Of course, the various arms 132, 134, the couplers 136, 140 and the coupling means 148, 152 of the interferometer structure 130 preferably take the form of waveguides on a common substrate.

In operation, the signals to be regenerated at the wavelength $\lambda_s$ are fed into the device 1 in accordance with the invention via the fiber 138 and enter the trunk of the coupler 138 via the interferometer structure 130. The signals to be regenerated are then split by the "Y" coupler 136 and coupled into the first and second interferometer arms 132 and 134.

In the first interferometer arm 132, amplitude/phase modulation of the signals to be regenerated is controlled by the recovered clock signals which propagate in the ring laser described above which leads to "3R" regeneration of the output signals of the interferometer structure due to the effects of interference with the signals from the second arm 134 in the trunk of the "Y" coupler 140.

The signals regenerated in this way then propagate in the output fiber 142.

As a precaution, to eliminate any spurious optical signals at the wavelength $\lambda_{ck}$, there can be a filter in the fiber 142 whose center wavelength is the wavelength of the signals to be regenerated.

During this time, the recovered clock signals propagate in the ring laser described above and control regeneration of the optical signals at the wavelength $\lambda_s$, as described with reference to the first embodiment, shown in FIGS. 1 to 4.

The direction of propagation of the clock signals imposed by the optical isolator 154 is advantageously a contrapropagating direction relative to the signals to be regenerated.

However, a copropagating direction is feasible, and in this case a filter whose center wavelength is the wavelength $\lambda_s$ becomes obligatory in the output fiber 142.

Figure 6:
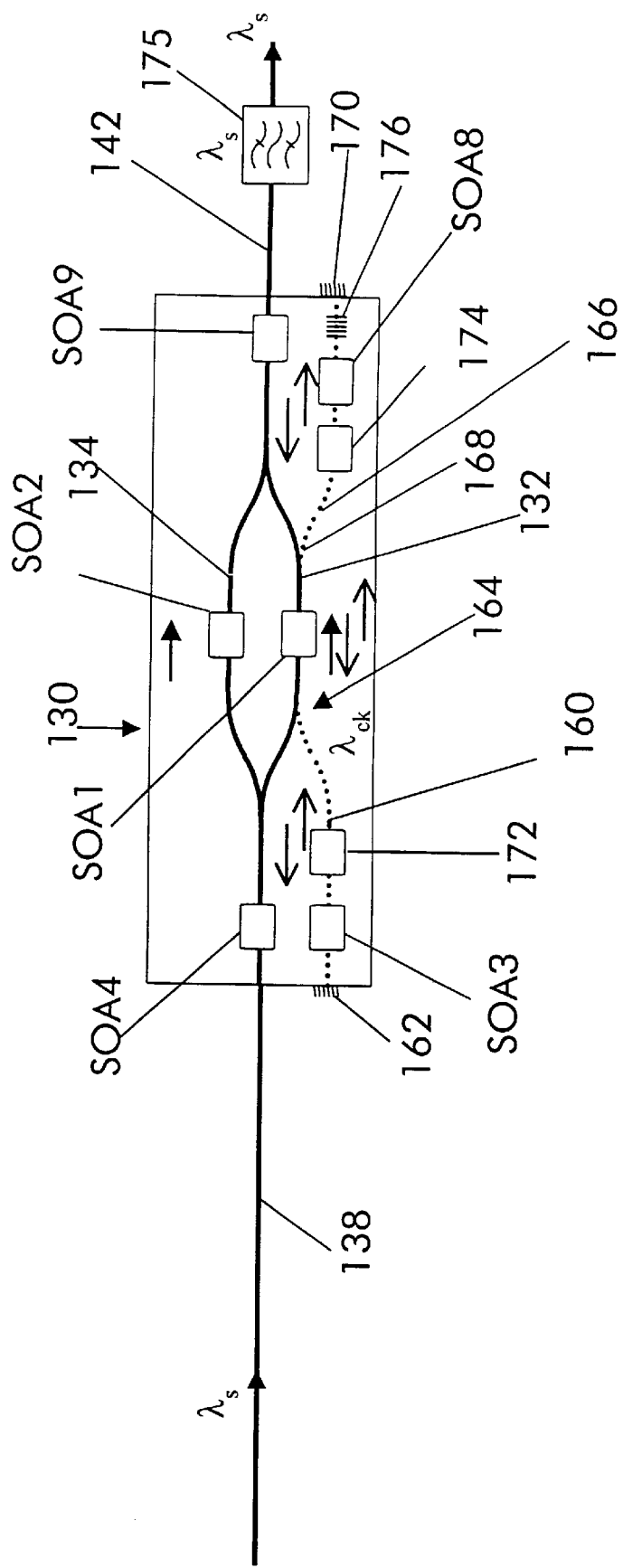
FIG. 6 is a block diagram of a variant of the FIG. 5 embodiment.

FIG. 6 shows a variant of the embodiment shown in FIG. 5.

This variant is distinguished in that the mode locking laser is a resonant cavity oscillator and not a ring laser.

The mode locking laser includes a first lateral branch 160 in the form of a waveguide one end 162 of which is totally reflective for the optical clock signals and whose other end 164 is coupled to the first interferometer arm 132, the first arm 132 defining the center part of the resonant cavity, and a second lateral branch 166 in the form of a waveguide, one end 168 of which is coupled to the first arm 132 and whose other end 170 is totally reflective for the optical clock signals.

The clock signals are amplified in the laser not only by the common amplifier SOA1 but also by the respective additional amplifiers SOA3 and SOA8 in the first branch 160 and the second branch 166.

There are respective phase areas 172 and 174 in the first lateral branch 160 and the second lateral branch 166 for adjusting the length of the cavity.

Like the resonant cavity laser shown in FIG. 2, the laser shown in FIG. 6 also has a selector filter 176 whose center wavelength is the wavelength $\lambda_{ck}$ of the optical clock signals to be recovered and which is preferably in the form of a Bragg filter written in the waveguide.

Also, there is a filter 29 in the output fiber 142 whose center wavelength is the wavelength $\lambda_s$ of the regenerated signals.

Apart from the structure of the laser for recovering clock signals, this variant operates in the same manner as the regenerator shown in FIG. 5.

It is therefore obvious that said interferometer structure and the mode locking laser are implemented as integrated components on the same substrate, which makes the regenerator very compact and also reliable in operation.

Figure 7:
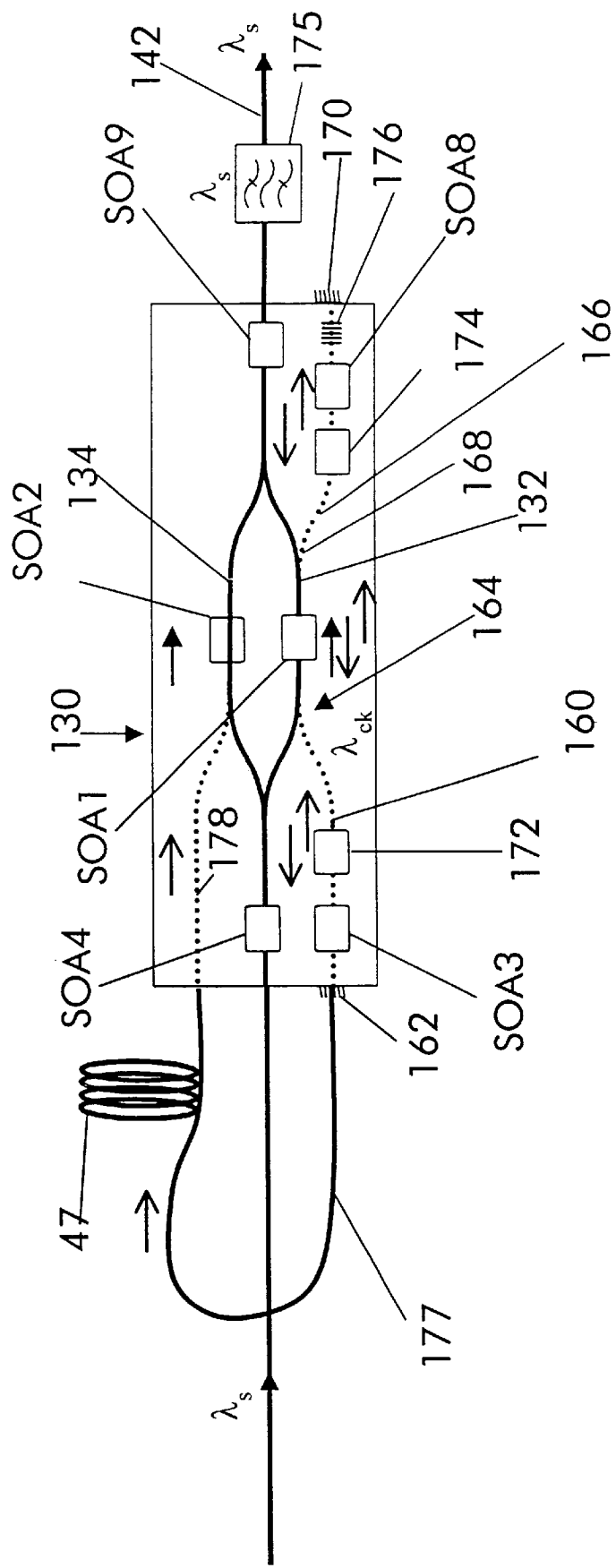
FIG. 7 is a block diagram of an improved version of the device shown in FIG. 6.

Finally, FIG. 7 shows an advantageous improvement on the regenerator shown in FIG. 6 whereby the end 162 of the lateral branch 160 is partly transparent for the recovered clock signals, to enable those clock signals to be coupled into the second arm 134 of the interferometer structure via a fiber 177, in which there are preferably means 47 for storing clock signals, and coupling means 178 in the form of a waveguide.

What is claimed is:

1. A device for regenerating optical signals by intensity modulation and phase modulation of the optical signals, said device including:

a mode locking laser for recovering a clock signal representing the clock of the bits of the optical signals to be regenerated, and a modulation interferometer structure having a first interferometer arm and a second interferometer arm, enabling amplitude modulation and phase modulation of optical signals by said clock signal, and including a semiconductor amplifier in the first interferometer arm, wherein the mode locking laser is coupled to said first interferometer arm so that said amplifier of the first interferometer arm is a common component of the mode locking laser and said interferometer structure, and wherein said amplifier of the first arm is chosen so that the modulation of its gain caused by the effects of saturation by the optical signals to be regenerated triggers mode locking of said mode locking laser at a wavelength inside the emission band of the amplifier of the first interferometer arm.

2. A device according to claim 1, wherein there is a second amplifier in the second interferometer arm and wherein the device includes a second mode locking laser for recovering a second optical clock signal also representing the clock of the bits of the optical signals to be regenerated and having a second wavelength different from the wavelength of the clock signal of the first mode locking laser, the second mode locking laser being coupled to said second interferometer arm so that said amplifier of the second interferometer arm is a common component of the second mode locking laser and said interferometer structure.

3. A device according to claim 2, wherein said second semiconductor optical amplifier of the second interferometer arm is substantially identical to the first semiconductor optical amplifier of the first interferometer arm.

4. A device according to claim 1, wherein said interferometer structure is a Michelson structure and wherein the device further includes an optical circulator having a first port receiving the optical signals to be regenerated, a second port connected to the interferometer input/output port of the Michelson structure, and a third port which is an output port for the regenerated optical signals.

5. A device according to claim 4, wherein the mode locking laser is a ring laser including:
a fiber for recovering the clock signal whose input is coupled to an output fiber connected to the third port of said optical circulator and whose output is connected to first coupling means for coupling optical clock signals into the first arm of said interferometer structure,
said first interferometer arm with said first optical amplifier,
a connecting fiber for connecting the interferometer input/output of the interferometer structure to the second port to the optical circulator, and
a selector filter whose center wavelength is the wavelength of the optical clock signals, disposed in said recovery fiber or in said first coupling means.

6. A device according to claim 5, wherein there is an optical isolator in said recovery fiber to impose the direction of propagation of the recovered clock signals.

7. A device according to claim 5, wherein there are means for time storage of the clock signals in said recovery fiber to smooth the various spectral contributions of the recovered optical clock signals.

8. A device according to claim 7, wherein said storage means include an optical fiber of predefined length.

9. A device according to claim 5, wherein there is an additional semiconductor optical amplifier in said first coupling means.

10. A device according to claim 4, wherein the first arm of said interferometer structure has an end which is reflective for the optical signals to be regenerated and at least partially transparent for optical signals at the wavelength of the recovered clock signals, and wherein the mode locking laser is a ring laser including:
a fiber for recovering the clock signal, one end of which is coupled to said end of the first arm and whose other end is connected to first coupling means for coupling optical clock signals into the first arm of said interferometer structure,
said first interferometer arm with said first optical amplifier, and
a selector filter whose center wavelength is the wavelength of the optical clock signals, disposed in said recovery fiber or in said first coupling means.

11. A device according to claim 4, further including second coupling means for coupling recovered optical clock signals into the second arm of the interferometer structure.

12. A device according to claim 4, wherein the mode locking laser is a resonant cavity laser oscillator including:
the first arm of said interferometer structure and its end, which is reflective for the optical signals to be regenerated and for the recovered optical clock signals,
a lateral branch of said interferometer structure, one end of which is coupled to said first arm and whose other end is reflective for the optical clock signals, and
a selector filter in said lateral branch, whose center wavelength is the wavelength of the optical clock signals.

13. A device according to claim 12, wherein said selector filter is a Bragg reflector.

14. A device according to claim 12, wherein there is a phase area in said lateral branch for adjusting the optical length of the cavity.

15. A device according to claim 12, wherein there is an additional semiconductor optical amplifier in said lateral branch.

16. A device according to claim 12, wherein the interferometer structure and the mode locking laser are integrated on the same substrate.

17. A device according to claim 1, wherein said interferometer structure is a Mach-Zehnder structure.

18. A device according to claim 17, wherein said mode locking laser is a ring laser including:
a fiber for recovering the clock signal, whose input is coupled to first coupling means for sampling the clock signal from said first arm and whose output is connected to second coupling means for feeding optical clock signals propagating in the recovery fiber into the first arm,
an optical isolator for imposing the direction of propagation of the recovered clock signals, and
a selector filter whose center wavelength is the wavelength of the optical clock signals.

19. A device according to claim 18, wherein the direction of propagation of the clock signals imposed by the optical isolator is a contrapropagating direction relative to the signals to be regenerated.

20. A device according to claim 17, wherein the mode locking laser is a resonant cavity laser oscillator including:
a first lateral branch of said interferometer structure, one end of which is totally reflective for the optical clock signals and whose other end is coupled to said first arm,
said first arm of said interferometer structure, defining the central part of the cavity, and
a second lateral branch, one end of which is coupled to said first arm and whose other end is totally reflective for the optical clock signals.

21. A device according to claim 20, wherein said interferometer structure and the mode locking laser are implemented as integrated components on the same substrate.

22. A device according to claim 20, including a fiber for coupling a part of the power of the regenerated optical clock signals into the second arm of said interferometer structure.

23. A device according to claim 1, wherein said interferometer structure is an integrated component.

* * * * *